(12) United States Patent
Kitagawa et al.

(10) Patent No.: US 7,518,892 B2
(45) Date of Patent: Apr. 14, 2009

(54) SEMICONDUCTOR INTEGRATED CIRCUIT INCLUDING CHARGE PUMP AND ELECTRONIC DEVICE INCLUDING THE SEMICONDUCTOR INTEGRATED CIRCUIT

(75) Inventors: Atsushi Kitagawa, Kyoto (JP); Hiroshi Sawada, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 11/828,466

(22) Filed: Jul. 26, 2007

(65) Prior Publication Data

US 2008/0031023 A1 Feb. 7, 2008

(30) Foreign Application Priority Data

Aug. 2, 2006 (JP) ............................. 2006-210734

(51) Int. Cl.
*H02H 3/18* (2006.01)
(52) U.S. Cl. ........................................ 363/59; 363/60
(58) Field of Classification Search .................. 363/59, 363/60, 62

See application file for complete search history.

(56) References Cited

U.S. PATENT DOCUMENTS

| 6,198,645 | B1 * | 3/2001 | Kotowski et al. | ............... 363/59 |
| 7,084,864 | B1 * | 8/2006 | Wood | ......................... 345/211 |
| 7,282,985 | B2 * | 10/2007 | Yen et al. | ..................... 327/536 |
| 2003/0058666 | A1 * | 3/2003 | Myono | ....................... 363/59 |

FOREIGN PATENT DOCUMENTS

JP 2005-080395 3/2005

* cited by examiner

*Primary Examiner*—Akm E Ullah
*Assistant Examiner*—Nguyen Tran
(74) *Attorney, Agent, or Firm*—Fish & Richardson P.C.

(57) ABSTRACT

A semiconductor integrated circuit is electrically connected to first to fourth capacitors and includes first to eleventh switches. A tenth switch has a first terminal electrically connected to a second terminal of the second capacitor, and a second terminal electrically connected to a first terminal of the third capacitor. An eleventh switch has a first terminal electrically connected to a second terminal of the first capacitor, and a second terminal electrically connected to the first terminal of the third capacitor. A second terminal of the third capacitor is connected to a node at a fixed potential.

2 Claims, 9 Drawing Sheets

# SEMICONDUCTOR INTEGRATED CIRCUIT INCLUDING CHARGE PUMP AND ELECTRONIC DEVICE INCLUDING THE SEMICONDUCTOR INTEGRATED CIRCUIT

BACKGROUND OF THE INVENTION

1. Field of the Invention

The present invention relates to a semiconductor integrated circuit and an electronic device including the semiconductor integrated circuit, and particularly relates to a semiconductor integrated circuit including a charge pump and an electronic device including the semiconductor integrated circuit.

2. Description of the Background Art

An electronic device driven by a battery, such as a mobile telephone or a digital camera, includes a charge pump that boosts a voltage from, for example, the battery. The charge pump boosts an input voltage by a prescribed voltage boost factor and outputs the same. As to the voltage boost factor, factors of 1, 1.5 and 2, for example, are achieved (see Japanese Patent Laying-Open No. 2005-80395 (Patent Document 1)).

When a voltage boost factor of 1.5, for example, is set in a charge pump, it is necessary to supply a current 1.5 times as large as an output current to the charge pump. Therefore, it is necessary to cause the charge pump to output a voltage equal to or slightly larger than a voltage value intended to be obtained as an output voltage, to reduce power consumption. It is desirable to achieve voltage boost factors as various as possible.

FIG. 10 is a drawing that shows a configuration of a typical charge pump achieving voltage boost factors of 1, 1.5 and 2. With reference to FIG. 10, this charge pump includes switches SW1-SW9, external terminals T1-T4, an external terminal TOUT, capacitors C1 and C2, and a capacitor COUT. Switches SW1-SW9 are formed inside a semiconductor integrated circuit. Each of the capacitors is placed outside the semiconductor integrated circuit and connected to the switches in the semiconductor integrated circuit via the external terminals.

FIG. 11 is a drawing that shows a configuration of a typical charge pump achieving voltage boost factors of 1, 1.33, 1.5, and 2. With reference to FIG. 11, this charge pump includes switches SW1-SW14, external terminals T1-T6, an external terminal TOUT, capacitors C1-C3, and a capacitor COUT. As in the charge pump shown in FIG. 10, switches SW1-SW14 are formed inside a semiconductor integrated circuit. Each of the capacitors is placed outside the semiconductor integrated circuit and connected to the switches in the semiconductor integrated circuit via the external terminals.

As such, if a typical charge pump is intended to achieve a voltage boost factor of 1.33 as well, for example, in addition to voltage boost factors of 1, 1.5 and 2, a semiconductor integrated circuit is required to further include five switches and two external terminals, resulting in increase in chip area of the semiconductor integrated circuit.

SUMMARY OF THE INVENTION

An object of the present invention is to provide a semiconductor integrated circuit capable of achieving much more voltage boost factors and preventing increase in chip area, and an electronic device including the semiconductor integrated circuit.

A semiconductor integrated circuit according to an aspect of the present invention is a semiconductor integrated circuit electrically connected to a first capacitor, a second capacitor, a third capacitor, and a fourth capacitor, including: a first switch having a first terminal connected to a node at a first potential, and a second terminal electrically connected to a first terminal of the first capacitor; a second switch having a first terminal connected to the node at the first potential, and a second terminal electrically connected to a second terminal of the first capacitor; a third switch having a first terminal electrically connected to the first terminal of the first capacitor, and a second terminal electrically connected to a first terminal of the fourth capacitor; a fourth switch having a first terminal electrically connected to the second terminal of the first capacitor, and a second terminal connected to a node at a second potential lower than the first potential; a fifth switch having a first terminal electrically connected to the second terminal of the first capacitor, and a second terminal electrically connected to a first terminal of the second capacitor; a sixth switch having a first terminal connected to the node at the first potential, and a second terminal electrically connected to the first terminal of the second capacitor; a seventh switch having a first terminal connected to the node at the first potential, and a second terminal electrically connected to a second terminal of the second capacitor; an eighth switch having a first terminal electrically connected to the first terminal of the second capacitor, and a second terminal electrically connected to the first terminal of the fourth capacitor; a ninth switch having a first terminal electrically connected to the second terminal of the second capacitor, and a second terminal connected to the node at the second potential; a tenth switch having a first terminal electrically connected to the second terminal of the second capacitor, and a second terminal electrically connected to a first terminal of the third capacitor; and an eleventh switch having a first terminal electrically connected to the second terminal of the first capacitor, and a second terminal electrically connected to the first terminal of the third capacitor. A second terminal of the third capacitor is connected to the node at the second potential.

Preferably, the semiconductor integrated circuit further includes a control circuit alternately switching between a first state in which each of the first switch, the fifth switch, and the tenth switch is in an on state, while each of the second switch, the third switch, the fourth switch, the sixth switch, the seventh switch, the eighth switch, the ninth switch, and the eleventh switch is in an off state, and a second state in which each of the second switch, the third switch, the seventh switch, and the eighth switch is in the on state, while each of the first switch, the fourth switch, the fifth switch, the sixth switch, the ninth switch, the tenth switch, and the eleventh switch is in the off state.

Preferably, the semiconductor integrated circuit further includes a control circuit alternately switching between a first state in which each of the second switch, the third switch, the sixth switch, and the tenth switch is in an on state, while each of the first switch, the fourth switch, the fifth switch, the seventh switch, the eighth switch, the ninth switch, and the eleventh switch is in an off state, and a second state in which each of the first switch, the seventh switch, the eighth switch, and the eleventh switch is in the on state, while each of the second switch, the third switch, the fourth switch, the fifth switch, the sixth switch, the ninth switch, and the tenth switch is in the off state.

An electronic device according to an aspect of the present invention includes: a first capacitor; a second capacitor; a third capacitor; a fourth capacitor; and a semiconductor integrated circuit. The semiconductor integrated circuit includes a first switch having a first terminal connected to a node at a first potential, and a second terminal electrically connected to a first terminal of the first capacitor, a second switch having a first terminal connected to the node at the first potential, and a second terminal electrically connected to a second terminal of the first capacitor, a third switch having a first terminal electrically connected to the first terminal of the first capacitor, and a second terminal electrically connected to a first terminal of the fourth capacitor, a fourth switch having a first terminal electrically connected to the second terminal of the first capacitor, and a second terminal connected to a node at a second potential lower than the first potential, a fifth switch having a first terminal electrically connected to the second terminal of the first capacitor, and a second terminal electrically connected to a first terminal of the second capacitor, a sixth switch having a first terminal connected to the node at the first potential, and a second terminal electrically connected to the first terminal of the second capacitor, a seventh switch having a first terminal connected to the node at the first potential, and a second terminal electrically connected to a second terminal of the second capacitor, an eighth switch having a first terminal electrically connected to the first terminal of the second capacitor, and a second terminal electrically connected to the first terminal of the fourth capacitor, a ninth switch having a first terminal electrically connected to the second terminal of the second capacitor, and a second terminal connected to the node at the second potential, a tenth switch having a first terminal electrically connected to the second terminal of the second capacitor, and a second terminal electrically connected to a first terminal of the third capacitor, and an eleventh switch having a first terminal electrically connected to the second terminal of the first capacitor, and a second terminal electrically connected to the first terminal of the third capacitor. A second terminal of the third capacitor is connected to the node at the second potential.

According to the present invention, it is possible to achieve much more voltage boost factors and prevent increase in chip area.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
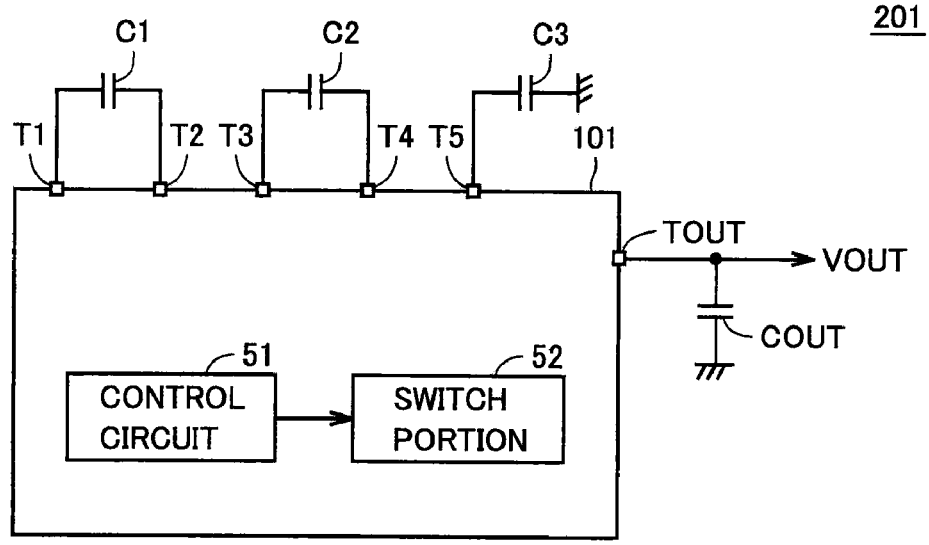
FIG. 1 is a drawing that shows a configuration of an electronic device according to an embodiment of the present invention.

An embodiment of the present invention will hereinafter be described with reference to the drawings. It is noted that the same or corresponding portions in the drawings are provided with the same reference characters and the description thereof will not be repeated.

[Configuration and Basic Operation]

FIG. 1 is a drawing that shows a configuration of an electronic device according to an embodiment of the present invention. With reference to FIG. 1, an electronic device 201 includes a semiconductor integrated circuit 101, capacitors (first to third capacitors) C1-C3, and a capacitor (fourth capacitor) COUT. Semiconductor integrated circuit 101 includes a control circuit 51, a switch portion 52, external terminals T1-T5, and an external terminal TOUT. Capacitors C1-C3, capacitor COUT, and switch portion 52 form a charge pump 301.

Semiconductor integrated circuit 101 is electrically connected to capacitor C1, capacitor C2, capacitor C3, and capacitor COUT. It is noted that a configuration in which capacitors C1-C3 are included in semiconductor integrated circuit 101 may be adopted.

Control circuit 51 controls an on state and an off state of each of the plurality of switches included in switch portion 52 in accordance with a set voltage boost factor to thereby boost an input voltage VIN supplied from a node at a potential VIN, by the voltage boost factor, to generate an output voltage VOUT.

Figure 2:
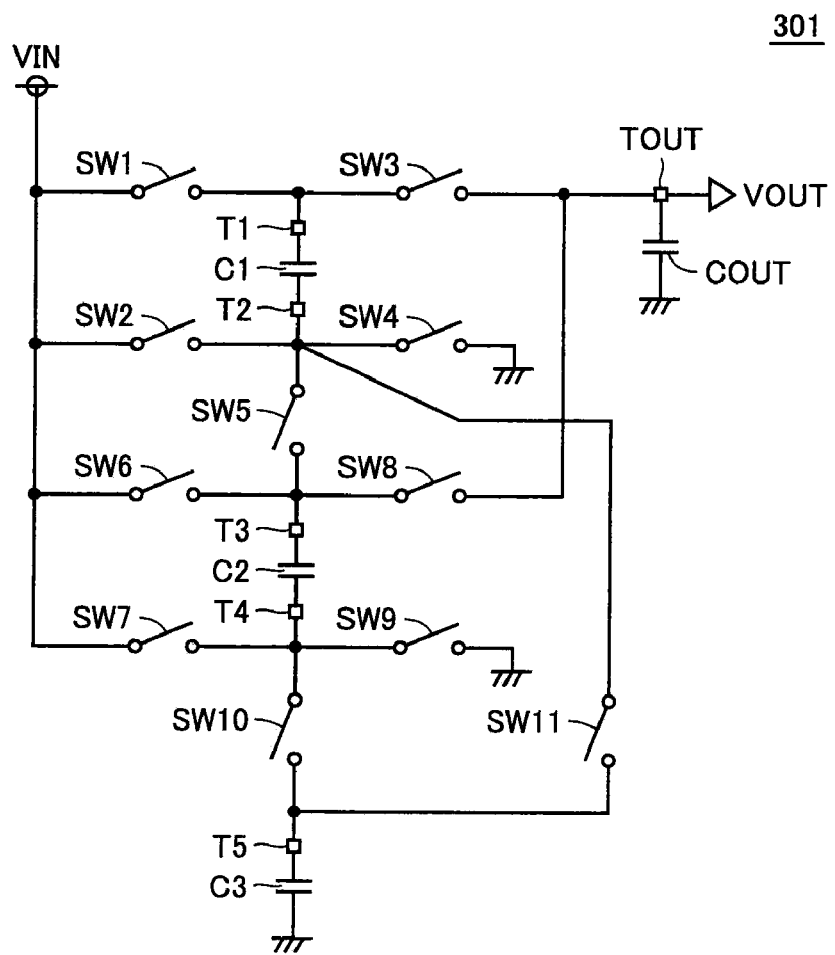
FIG. 2 is a drawing that shows a configuration of a charge pump according to the embodiment of the present invention.

FIG. 2 is a drawing that shows a configuration of the charge pump according to the embodiment of the present invention. With reference to FIG. 2, switch portion 52 includes switches (first to eleventh switches) SW1-SW11. Each of switches SW1-SW11 is, for example, a MOS (Metal Oxide Semiconductor) transistor. A configuration in which potential VIN is generated by semiconductor integrated circuit 101, or a configuration in which potential VIN is generated outside semiconductor integrated circuit 101, may be adopted.

Switch SW1 has a first terminal connected to the node at potential VIN, and a second terminal electrically connected to a first terminal of capacitor C1. Switch SW2 has a first terminal connected to the node at potential VIN, and a second terminal electrically connected to a second terminal of capacitor C1. Switch SW3 has a first terminal electrically connected to the first terminal of capacitor C1, and a second terminal electrically connected to a first terminal of capacitor COUT. Switch SW4 has a first terminal electrically connected to the second terminal of capacitor C1, and a second terminal connected to a node at a ground potential lower than potential VIN. Switch SW5 has a first terminal electrically connected to the second terminal of capacitor C1, and a second terminal electrically connected to a first terminal of capacitor C2. Switch SW6 has a first terminal connected to the node at potential VIN, and a second terminal electrically connected to the first terminal of capacitor C2. Switch SW7 has a first terminal connected to the node at potential VIN, and a second terminal electrically connected to a second terminal of capacitor C2. Switch SW8 has a first terminal electrically connected to the first terminal of capacitor C2, and a second terminal electrically connected to the first terminal of capacitor COUT. Switch SW9 has a first terminal electrically connected to the second terminal of capacitor C2, and a second terminal connected to the node at the ground potential. Switch SW10 has a first terminal electrically connected to the second terminal of capacitor C2, and a second terminal electrically connected to a first terminal of capacitor C3. Switch SW11 has a first terminal electrically connected to the second terminal of capacitor C1, and a second terminal electrically connected to the first terminal of capacitor C3. Each of a second terminal of capacitor C3 and a second terminal of capacitor COUT is connected to the node at the ground potential.

[Operation]

There will hereinafter be described an operation of the charge pump according to the embodiment of the present invention when it outputs a voltage.

Figure 3:
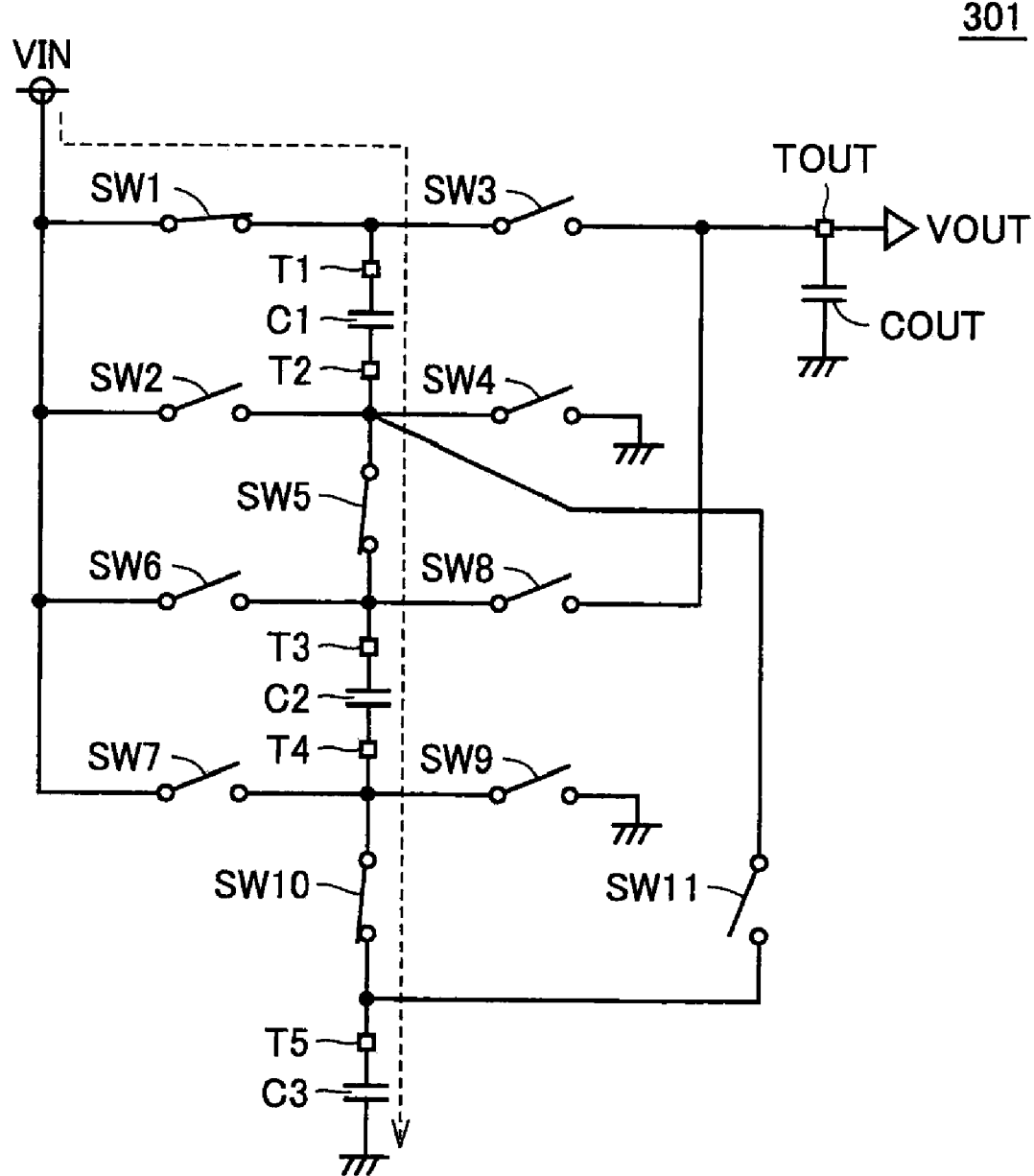
FIG. 3 is a drawing that shows a first state of switches when the charge pump according to the embodiment of the present invention outputs a voltage 1.33 times as large as an input voltage.

FIG. 3 is a drawing that shows a first state of the switches when the charge pump according to the embodiment of the present invention outputs a voltage 1.33 times as large as the input voltage.

With reference to FIG. 3, control circuit 51 maintains switch portion 52 in a first state. In other words, control circuit 51 maintains each of switch SW1, switch SW5, and switch SW10 in an on state, and maintains each of switch SW2, switch SW3, switch SW4, switch SW6, switch SW7, switch SW8, switch SW9, and switch SW11 in an off state.

Control circuit 51 maintains switch portion 52 in the first state to thereby apply input voltage VIN×⅓ to each of capacitors C1-C3 to charge capacitors C1-C3.

Figure 4:
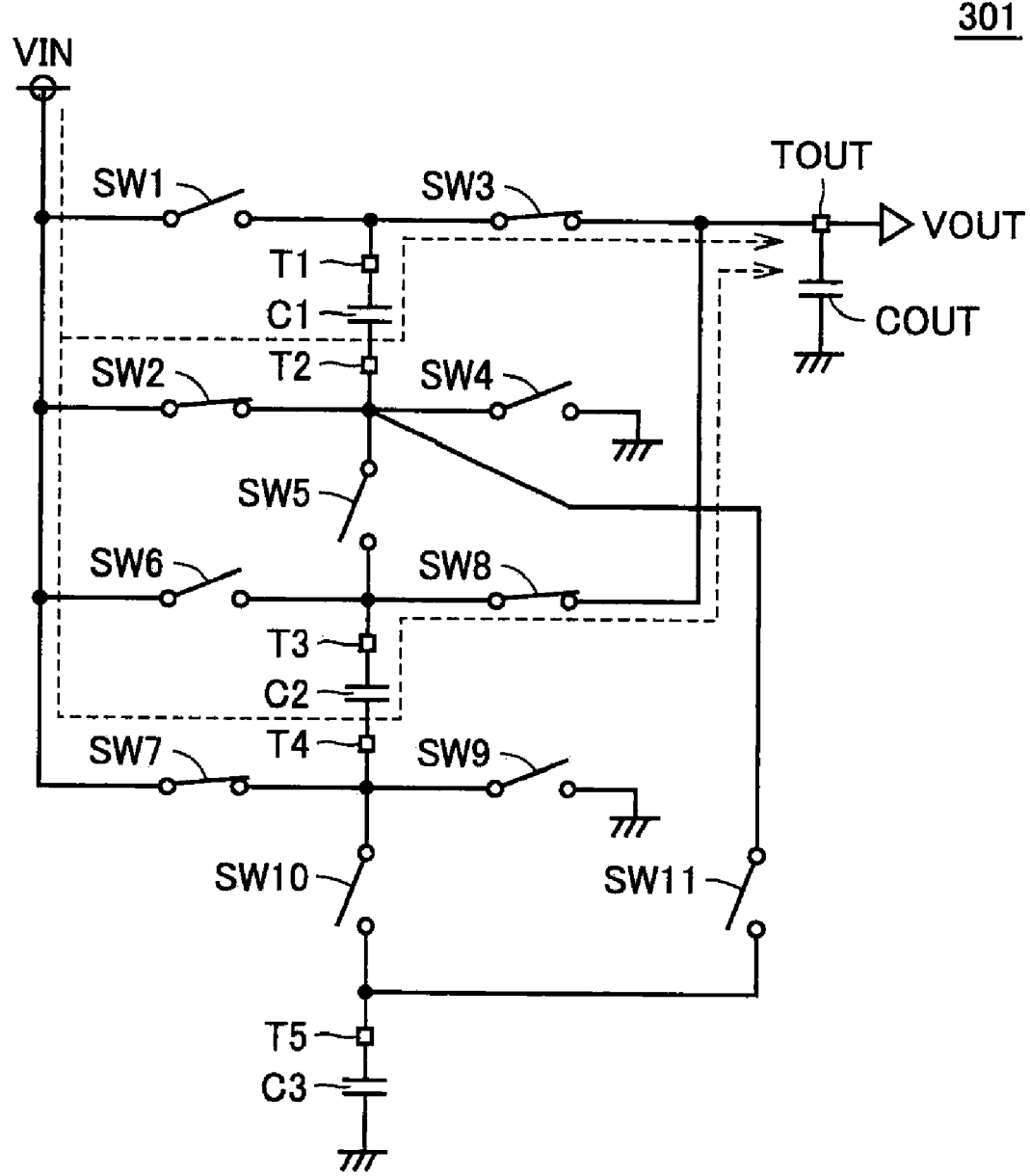
FIG. 4 is a drawing that shows a second state of the switches when the charge pump according to the embodiment of the present invention outputs the voltage 1.33 times as large as the input voltage.

FIG. 4 is a drawing that shows a second state of the switches when the charge pump according to the embodiment of the present invention outputs the voltage 1.33 times as large as the input voltage.

With reference to FIG. 4, control circuit 51 maintains switch portion 52 in a second state. In other words, control circuit 51 maintains each of switch SW2, switch SW3, switch SW7, and switch SW8 in the on state, and maintains each of switch SW1, switch SW4, switch SW5, switch SW6, switch SW9, switch SW10, and switch SW11 in the off state.

Control circuit 51 maintains switch portion 52 in the second state to thereby connect capacitors C1 and C2 in parallel to apply input voltage VIN in a direction opposite to that at the time of charging so that charges stored in capacitors C1 and C2 are released. Consequently, output voltage VOUT is equal to input voltage VIN×4/3, which is obtained by adding input voltage VIN×⅓ to input voltage VIN, namely, a voltage approximately 1.33 times as large as the input voltage.

Control circuit 51 alternately switches between the first state and the second state of switch portion 52 to thereby repeat charging of capacitors C1 and C2, and discharging of capacitors C1 and C2, to output a voltage approximately 1.33 times as large as input voltage VIN from charge pump 301 as output voltage VOUT.

Figure 5:
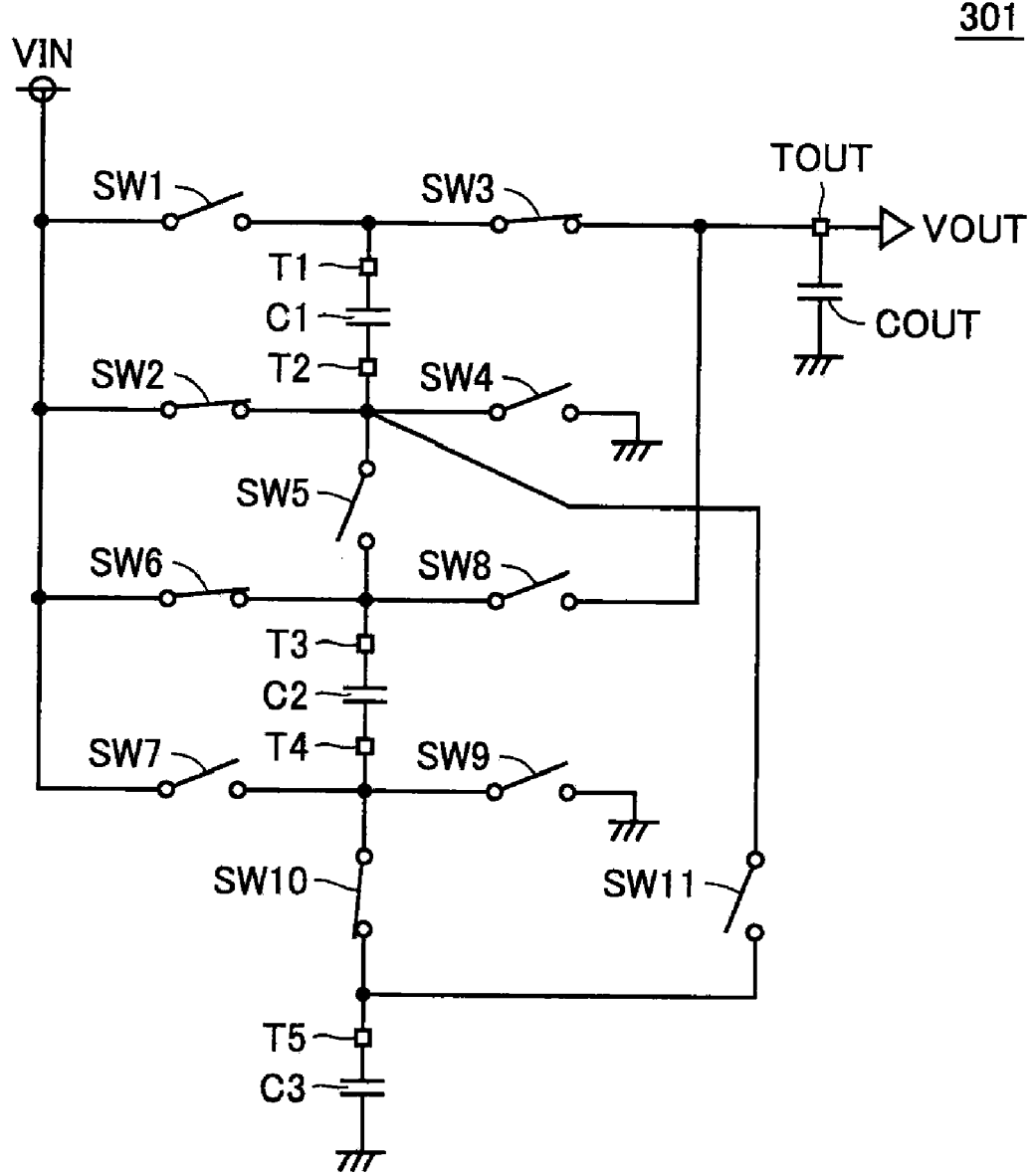
FIG. 5 is a drawing that shows a first state of the switches when the charge pump according to the embodiment of the present invention outputs a voltage 1.5 times as large as the input voltage.

FIG. 5 is a drawing that shows a first state of the switches when the charge pump according to the embodiment of the present invention outputs a voltage 1.5 times as large as the input voltage.

With reference to FIG. 5, control circuit 51 maintains switch portion 52 in a first state. In other words, control circuit 51 maintains each of switch SW2, switch SW3, switch SW6, and switch SW10 in the on state, and maintains each of switch SW1, switch SW4, switch SW5, switch SW7, switch SW8, switch SW9, and switch SW11 in an off state.

Control circuit 51 maintains switch portion 52 in the first state to thereby apply input voltage VIN×½ to each of capacitors C2 and C3 to charge capacitors C2 and C3.

Figure 6:
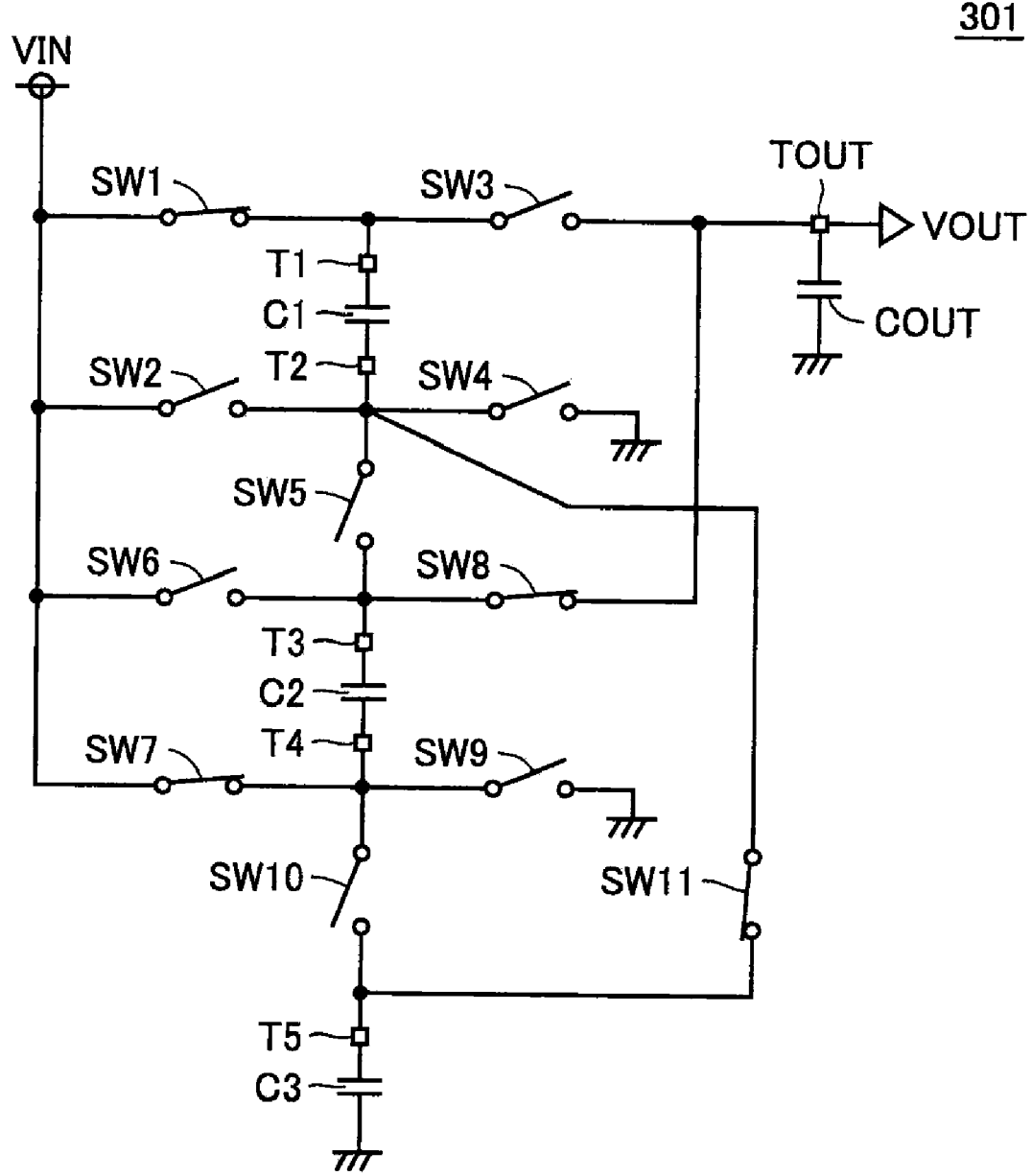
FIG. 6 is a drawing that shows a second state of the switches when the charge pump according to the embodiment of the present invention outputs the voltage 1.5 times as large as the input voltage.

FIG. 6 is a drawing that shows a second state of the switches when the charge pump according to the embodiment of the present invention outputs the voltage 1.5 times as large as the input voltage.

With reference to FIG. 6, control circuit 51 maintains switch portion 52 in a second state. In other words, control circuit 51 maintains each of switch SW1, switch SW7, switch SW8, and switch SW11 in the on state, and maintains each of switch SW2, switch SW3, switch SW4, switch SW5, switch SW6, switch SW9, and switch SW10 in the off state.

Control circuit 51 maintains switch portion 52 in the second state to thereby apply input voltage VIN×½ to each of capacitors C1 and C3 to charge capacitors C1 and C3, and additionally, apply input voltage VIN to capacitor C2 in a direction opposite to that at the time of charging so that charges stored in capacitor C2 are released. Consequently, output voltage VOUT is equal to input voltage VIN×1.5, which is obtained by adding input voltage VIN×½ to input voltage VIN.

Control circuit 51 alternately switches between the first state and the second state of switch portion 52 to thereby repeat discharging of capacitor C1 and charging of capacitor C2, and charging of capacitor C1 and discharging of capacitor C2, to output a voltage 1.5 times as large as input voltage VIN from charge pump 301 as output voltage VOUT.

In other words, control circuit 51 brings switch portion 52 into the first state again to thereby apply input voltage VIN×½ to each of capacitors C2 and C3 to charge capacitors C2 and C3, and additionally, apply input voltage VIN to capacitor C1 in a direction opposite to that at the time of charging so that charges stored in capacitor C1 are released. Consequently, output voltage VOUT is equal to input voltage VIN×1.5, which is obtained by adding input voltage VIN×½ to input voltage VIN.

With such a configuration, it is possible to charge one of capacitors C1 and C2 while discharging the other of capacitors C1 and C2, and hence output voltage VOUT can be prevented from lowering in the case where a load consumes large power, and other cases.

Figure 7:
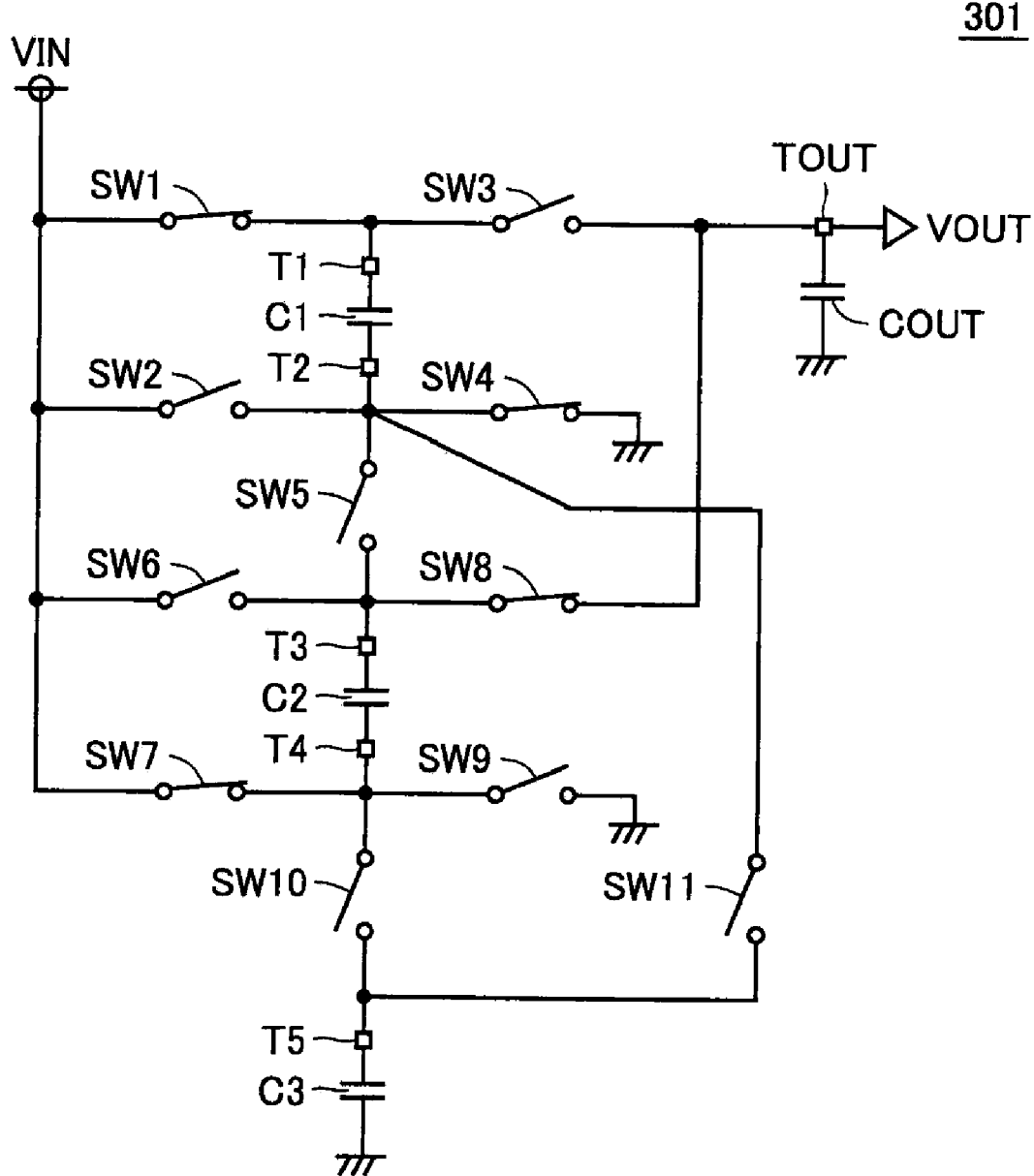
FIG. 7 is a drawing that shows a first state of the switches when the charge pump according to the embodiment of the present invention outputs a voltage 2.0 times as large as the input voltage.

FIG. 7 is a drawing that shows a first state of the switches when the charge pump according to the embodiment of the present invention outputs a voltage 2.0 times as large as the input voltage.

With reference to FIG. 7, control circuit 51 maintains switch portion 52 in a first state. In other words, control circuit 51 maintains each of switch SW1, switch SW4, switch SW7, and switch SW8 in an on state, and maintains each of switch SW2, switch SW3, switch SW5, switch SW6, switch SW9, switch SW10, and switch SW11 in an off state.

Control circuit 51 maintains switch portion 52 in the first state to thereby apply input voltage VIN to capacitor C1 to charge capacitor C1.

Figure 8:
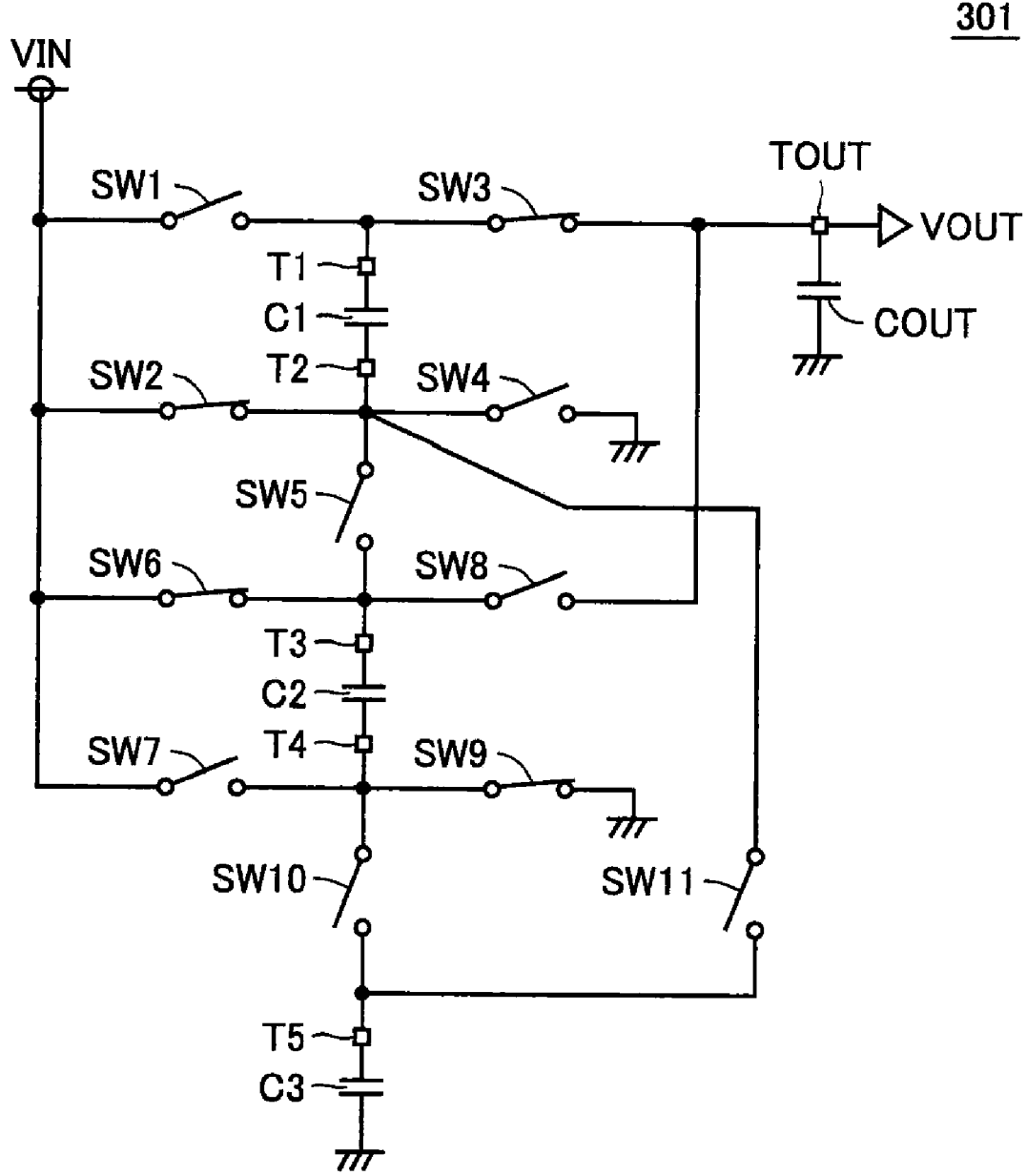
FIG. 8 is a drawing that shows a second state of the switches when the charge pump according to the embodiment of the present invention outputs the voltage 2.0 times as large as the input voltage.

FIG. 8 is a drawing that shows a second state of the switches when the charge pump according to the embodiment of the present invention outputs the voltage 2.0 times as large as the input voltage.

With reference to FIG. 8, control circuit 51 maintains switch portion 52 in a second state. In other words, control circuit 51 maintains each of switch SW2, switch SW3, switch SW6, and switch SW9 in the on state, and maintains each of switch SW1, switch SW4, switch SW5, switch SW7, switch SW8, switch SW10, and switch SW11 in the off state.

Control circuit 51 maintains switch portion 52 in the second state to thereby apply input voltage VIN to capacitor C2 to charge capacitor C2, and additionally, apply input voltage VIN to capacitor C1 in a direction opposite to that at the time of charging so that charges stored in capacitor C1 are released. Consequently, output voltage VOUT is equal to input voltage VIN×2.0, which is obtained by adding input voltage VIN to input voltage VIN.

Control circuit 51 alternately switches between the first state and the second state of switch portion 52 to thereby repeat charging of capacitor C1 and discharging of capacitor C2, and discharging of capacitor C1 and charging of capacitor C2, to output a voltage 2.0 times as large as the input voltage from charge pump 301 as output voltage VOUT.

In other words, control circuit 51 brings switch portion 52 into the first state again to thereby apply input voltage VIN to capacitor C1 to charge capacitor C1, and additionally, apply input voltage VIN to capacitor C2 in a direction opposite to that at the time of charging so that charges stored in capacitor C2 are released. Consequently, output voltage VOUT is equal to input voltage VIN×2.0, which is obtained by adding input voltage VIN to input voltage VIN.

With such a configuration, it is possible to charge one of capacitors C1 and C2 while discharging the other of capacitors C1 and C2, and hence output voltage VOUT can be prevented from lowering in the case where a load consumes large power, and other cases.

Figure 9:
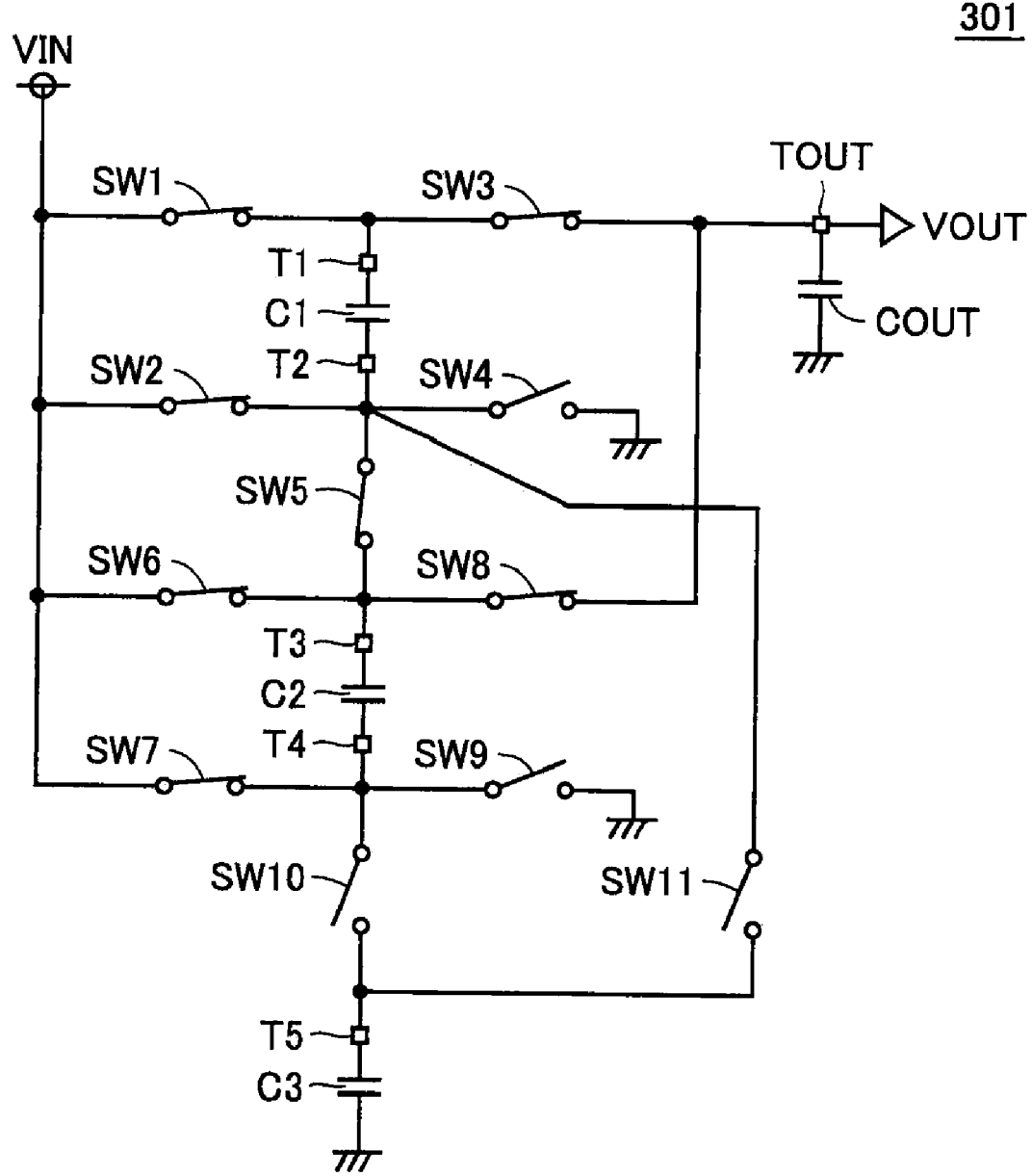
FIG. 9 is a drawing that shows a state of the switches when the charge pump according to the embodiment of the present invention outputs a voltage 1.0 times as large as the input voltage.

FIG. 9 is a drawing that shows a state of the switches when the charge pump according to the embodiment of the present invention outputs a voltage 1.0 times as large as the input voltage.

With reference to FIG. 9, control circuit 51 maintains each of switch SW1, switch SW2, switch SW3, switch SW5, switch SW6, switch SW7, and switch SW8 in an on state, and maintains each of switch SW4, switch SW9, switch SW10, and switch SW11 in an off state. In such a state, output voltage VOUT is equal to input voltage VIN×1.0.

Figure 10:
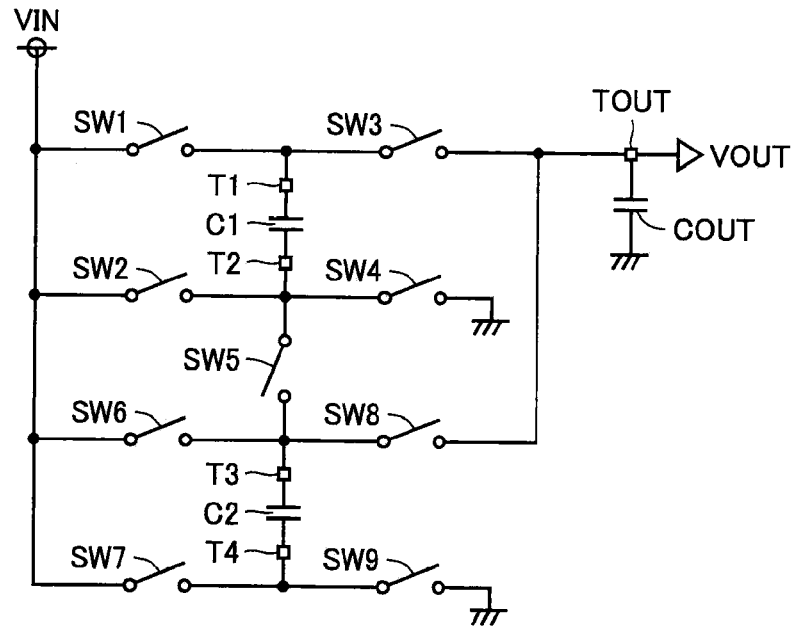
FIG. 10 is a drawing that shows a configuration of a typical charge pump achieving voltage boost factors of 1, 1.5 and 2.
Figure 11:
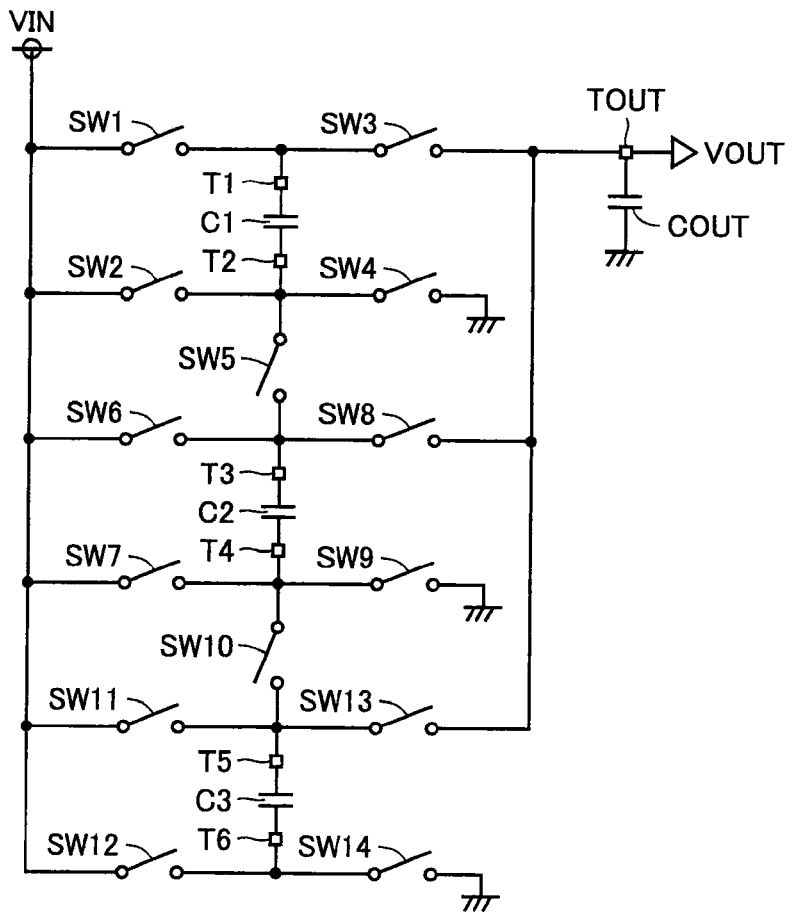
FIG. 11 is a drawing that shows a configuration of a typical charge pump achieving voltage boost factors of 1, 1.33, 1.5, and 2.

If a typical charge pump is intended to achieve a voltage boost factor of 1.33 as well, for example, in addition to voltage boost factors of 1, 1.5 and 2, it includes 14 switches, seven external terminals, and four capacitors. In other words, a semiconductor integrated circuit included in the charge pump is required to further include five switches SW10-SW14 and two external terminals T5 and T6, resulting in a problem of increase in chip area of the semiconductor integrated circuit. In contrast, the charge pump according to the embodiment of the present invention includes 11 switches, four capacitors, and six external terminals so as to achieve a voltage boost factor of 1.33 in addition to voltage boost factors of 1, 1.5 and 2. In other words, semiconductor integrated circuit 101 can achieve the voltage boost factor of 1.33 in addition to the voltage boost factors of 1, 1.5 and 2, only by adding two switches SW10 and SW11 and one external terminal T5 to the semiconductor integrated circuit included in the charge pump shown in FIG. 10.

Here, a MOS transistor, which serves as a switch formed in the semiconductor integrated circuit, tends to have a large size to lower on-state resistance. Accordingly, by preventing increase in number of switches, increase in chip area of the semiconductor integrated circuit can effectively be prevented. Furthermore, by reducing the number of external terminals for connecting to capacitors, it is possible to facilitate pattern designing of the substrate where a semiconductor integrated circuit is to be mounted. Accordingly, in the semiconductor integrated circuit according to the embodiment of the present invention, it is possible to achieve much more voltage boost factors and prevent increase in chip area.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A semiconductor integrated circuit electrically connected to a first capacitor, a second capacitor, a third capacitor, and a fourth capacitor, comprising:

a first switch having a first terminal connected to a node at a first potential, and a second terminal electrically connected to a first terminal of said first capacitor;

a second switch having a first terminal connected to the node at said first potential, and a second terminal electrically connected to a second terminal of said first capacitor;

a third switch having a first terminal electrically connected to the first terminal of said first capacitor, and a second terminal electrically connected to a first terminal of said fourth capacitor;

a fourth switch having a first terminal connected to the second terminal of said first capacitor, and a second terminal connected to a node at a second potential lower than said first potential;

a fifth switch having a first terminal electrically connected to the second terminal of said first capacitor, and a second terminal electrically connected to a first terminal of said second capacitor;

a sixth switch having a first terminal connected to the node at said first potential, and a second terminal connected to the first terminal of said second capacitor;

a seventh switch having a first terminal connected to the node at said first potential, and a second terminal connected to a second terminal of said second capacitor;

an eighth switch having a first terminal electrically connected to the first terminal of said second capacitor, and a second terminal electrically connected to the first terminal of said fourth capacitor;

a ninth switch having a first terminal electrically connected to the second terminal of said second capacitor, and a second terminal connected to the node at said second potential;

a tenth switch having a first terminal electrically connected to the second terminal of said second capacitor, and a second terminal electrically connected to a first terminal of said third capacitor; and an eleventh switch having a first terminal connected to the second terminal of said first capacitor, and a second terminal connected to the first terminal of said third capacitor, wherein a second terminal of said third capacitor is connected to the node at said second potential, wherein the first terminal of the fourth switch is directly connected to the second terminal of the first capacitor, wherein the second terminal of the sixth switch is directly connected to the first terminal of the second capacitor, wherein the second terminal of the seventh switch is directly connected to the second terminal of the second capacitor wherein the first terminal of the eleventh switch is directly connected to the second terminal of the first capacitor, and wherein the second terminal of the eleventh switch is directly connected to the first terminal of the third capacitor.

2. An electronic device, comprising:
a first capacitor;
a second capacitor;
a third capacitor;
a fourth capacitor; and
a semiconductor integrated circuit,
wherein said semiconductor integrated circuit includes:
- a first switch having a first terminal connected to a node at a first potential, and a second terminal electrically connected to a first terminal of said first capacitor,
- a second switch having a first terminal connected to the node at said first potential, and a second terminal electrically connected to a second terminal of said first capacitor,
- a third switch having a first terminal electrically connected to the first terminal of said first capacitor, and a second terminal electrically connected to a first terminal of said fourth capacitor,
- a fourth switch having a first terminal connected to the second terminal of said first capacitor, and a second terminal connected to a node at a second potential lower than said first potential,
- a fifth switch having a first terminal electrically connected to the second terminal of said first capacitor, and a second terminal electrically connected to a first terminal of said second capacitor,
- a sixth switch having a first terminal connected to the node at said first potential, and a second terminal connected to the first terminal of said second capacitor,
- a seventh switch having a first terminal connected to the node at said first potential, and a second terminal connected to a second terminal of said second capacitor,
- an eighth switch having a first terminal electrically connected to the first terminal of said second capacitor, and a second terminal electrically connected to the first terminal of said fourth capacitor,
- a ninth switch having a first terminal electrically connected to the second terminal of said second capacitor, and a second terminal connected to the node at said second potential,
- a tenth switch having a first terminal electrically connected to the second terminal of said second capacitor, and a second terminal electrically connected to a first terminal of said third capacitor, and
- an eleventh switch having a first terminal connected to the second terminal of said first capacitor, and a second terminal connected to the first terminal of said third capacitor, wherein a second terminal of said third capacitor is connected to the node at said second potential;

wherein the first terminal of the fourth switch is directly connected to the second terminal of the first capacitor, wherein the second terminal of the sixth switch is directly connected to the first terminal of the second capacitor, wherein the second terminal of the seventh switch is directly connected to the second terminal of the second capacitor, wherein the first terminal of the eleventh switch is directly connected to the second terminal of the first capacitor, and wherein the second terminal of the eleventh switch is directly connected to the first terminal of the third capacitor.

* * * * *